United States Patent [19]
Capelle

[11] Patent Number: 5,297,866
[45] Date of Patent: Mar. 29, 1994

[54] APPARATUS FOR PRODUCING A CONTROLLABLE UNIFORM CONVEYING PRESSURE FOR PROCESSING HIGHLY VISCOUS RUBBER OR THERMOPLASTICS

[75] Inventor: Gerd Capelle, Langenhagen, Fed. Rep. of Germany

[73] Assignee: Hermann Berstorff Maschinenbau GmbH, Hannover, Fed. Rep. of Germany

[21] Appl. No.: 944,333

[22] Filed: Sep. 14, 1992

[30] Foreign Application Priority Data

Sep. 12, 1991 [DE] Fed. Rep. of Germany ....... 4130312

[51] Int. Cl.$^5$ ............................................. B29B 1/06
[52] U.S. Cl. ..................................... 366/097; 418/206
[58] Field of Search ................... 366/69, 97, 272, 85, 366/84, 301, 300; 425/200, 209; 418/206

[56] References Cited

U.S. PATENT DOCUMENTS

| 2,369,249 | 2/1945 | Rainalter | 418/206 |
| 3,276,387 | 10/1966 | Bottoms | 418/206 |
| 3,472,170 | 10/1969 | Eckerle | 418/206 |

FOREIGN PATENT DOCUMENTS

3615830 11/1986 Fed. Rep. of Germany.

Primary Examiner—Robert W. Jenkins
Attorney, Agent, or Firm—Walter Ottesen

[57] ABSTRACT

The invention relates to an apparatus for producing a controllable, uniform conveying pressure for processing highly viscous, temperature sensitive rubber or thermoplastics material. The apparatus includes two rotating conveying elements that conjointly form a toothlike sealing profile and that are arranged on respective shafts in a housing. The root circle diameters of the conveying elements more or less correspond to the diameters of the shaft sections axially adjacent to the conveying elements. For this reason, the radial end faces of the conveying elements are avoided and so are the difficult sealing problems which would otherwise be present at these end faces. The shaft sections adjacent the conveying elements guide and keep the toothed profiles in alignment with each other as they rotate to convey the material.

7 Claims, 4 Drawing Sheets

APPARATUS FOR PRODUCING A CONTROLLABLE UNIFORM CONVEYING PRESSURE FOR PROCESSING HIGHLY VISCOUS RUBBER OR THERMOPLASTICS

FIELD OF THE INVENTION

The invention relates to an apparatus for producing a controllable, uniform conveying pressure for processing highly viscous rubber or thermoplastics. The apparatus has two rotating conveying elements that form a tooth-like sealing profile and that are arranged on shafts in a housing. The housing is provided with an inlet and an outlet for the material to be conveyed and the conveying elements with both shaft ends are supported in the housing and can be driven separately or together.

BACKGROUND OF THE INVENTION

An apparatus of the kind described above is disclosed in German Patent 3,615,830.

If highly viscous materials such as certain types of rubber are to be processed in such an apparatus, major problems with the radial sealing of the gear faces occur, this being the reason why such temperature sensitive materials have not been processed in gear-pump-type apparatus thus far.

Axial sealing of the shafts for the gears, however, is relatively unproblematic because of helical return threads.

Sealing the end faces of the gears to the housing in radial direction down to the shaft of the gears constitutes a most difficult problem. It is indispensable for the conveyance of temperature sensitive rubber to avoid the formation of dead corners or dead space in the apparatus because the rubber would be partially vulcanized there, which would contaminate the compound and, thus, render it unusable.

SUMMARY OF THE INVENTION

It is an object of the invention to provide an apparatus for producing a controllable, uniform conveying pressure for processing highly viscous, temperature sensitive materials, for example, highly viscous rubber compounds or highly viscous thermoplastics while at the same time eliminating all problems concerning the sealing at the radial end faces of the conveying elements.

The apparatus of the invention is for producing a controllable uniform conveying pressure for processing highly viscous rubber or thermoplastics material and includes: a housing having an inlet opening for receiving the material and an outlet for passing the material from the housing; two shafts rotatably journalled in the housing; each of the shafts being subdivided into a left-hand section, a center section and a right-hand section; the shafts having respective toothed profiles at the respective center sections thereof; the shafts being arranged side by side so as to cause the toothed profiles to intermesh in seal-tight contact while rotating to thereby receive the material from the inlet and convey the material to the outlet; first mounting means for holding the left-hand sections of the shafts and second mounting means for holding the right-hand sections of the shafts thereby guiding and keeping the toothed profiles in alignment with each other as they rotate to convey the material; and, the shafts having a diameter (d) at the left-hand and right-hand sections and the toothed profiles each having a root circle diameter D corresponding approximately to the diameter (d).

By designing the shaft sections on both sides of the teeth of the conveying element with a diameter that more or less corresponds to the root circle diameter of the gear, the radial gaps between the gear end faces and the housing are eliminated, thus rendering measures to return the material from these gaps unnecessary because the radial gap or rather the radial end faces themselves are avoided.

Since the parts of the shafts next to the gears have almost the same diameter as the root circle diameter of the gear-like conveying elements, it is possible to use relatively thick shafts that are able to transmit higher torques and this is very favorable for processing highly viscous rubber compounds. Thick shafts do not bend even under high stress and permit, without becoming noticeably weaker, the introduction of heating/cooling bores, which offers further possibilities of advantageously using the apparatus for materials highly sensitive to temperature. The shearing energy that is introduced into the rubber by the conveying process can thus be removed again by means of a coolant passed through the heating/cooling bores.

Furthermore, it is of great advantage that both the toothed conveying elements and the shaft sections can be made in one piece, which facilitates manufacturing and mounting considerably and provides a significant cost savings.

A shaft diameter and a root circle diameter of exactly the same size is advantageously produced by shrinking a sleeve onto the shaft section adjacent to the gear.

Milling the teeth of the conveying element requires the diameter of the adjacent shaft section to be dimensioned slightly smaller. This minor reduction of diameter can be advantageously corrected by shrinking a sleeve onto the shaft sections so as to eliminate even a very small radial gap between the end faces and the housing.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
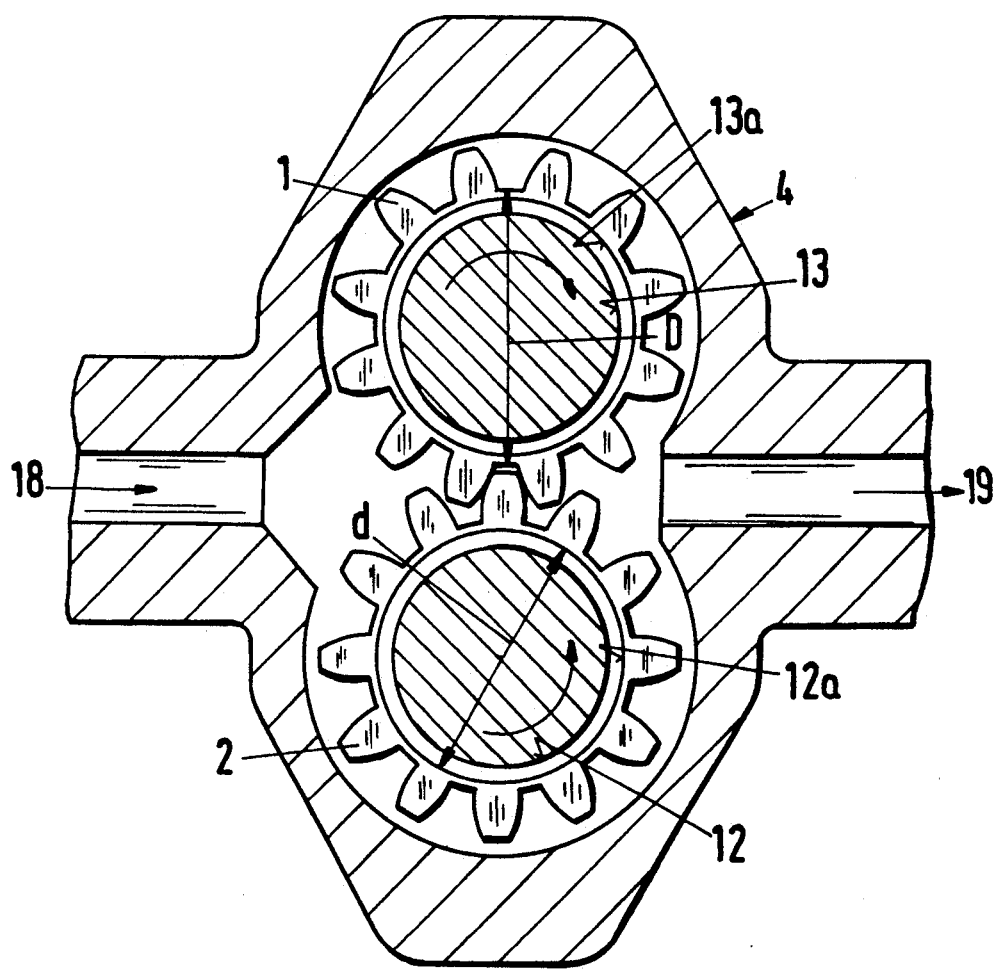
FIG. 1 is a section view of the apparatus of the invention taken along line I—I of FIG. 2.

FIG. 1 represents two toothed conveying elements 1 and 2, which form a sealing profile with each other and are arranged in a housing 4. The housing 4 is provided with a material inlet opening 18 and an outlet opening 19.

Figure 2:
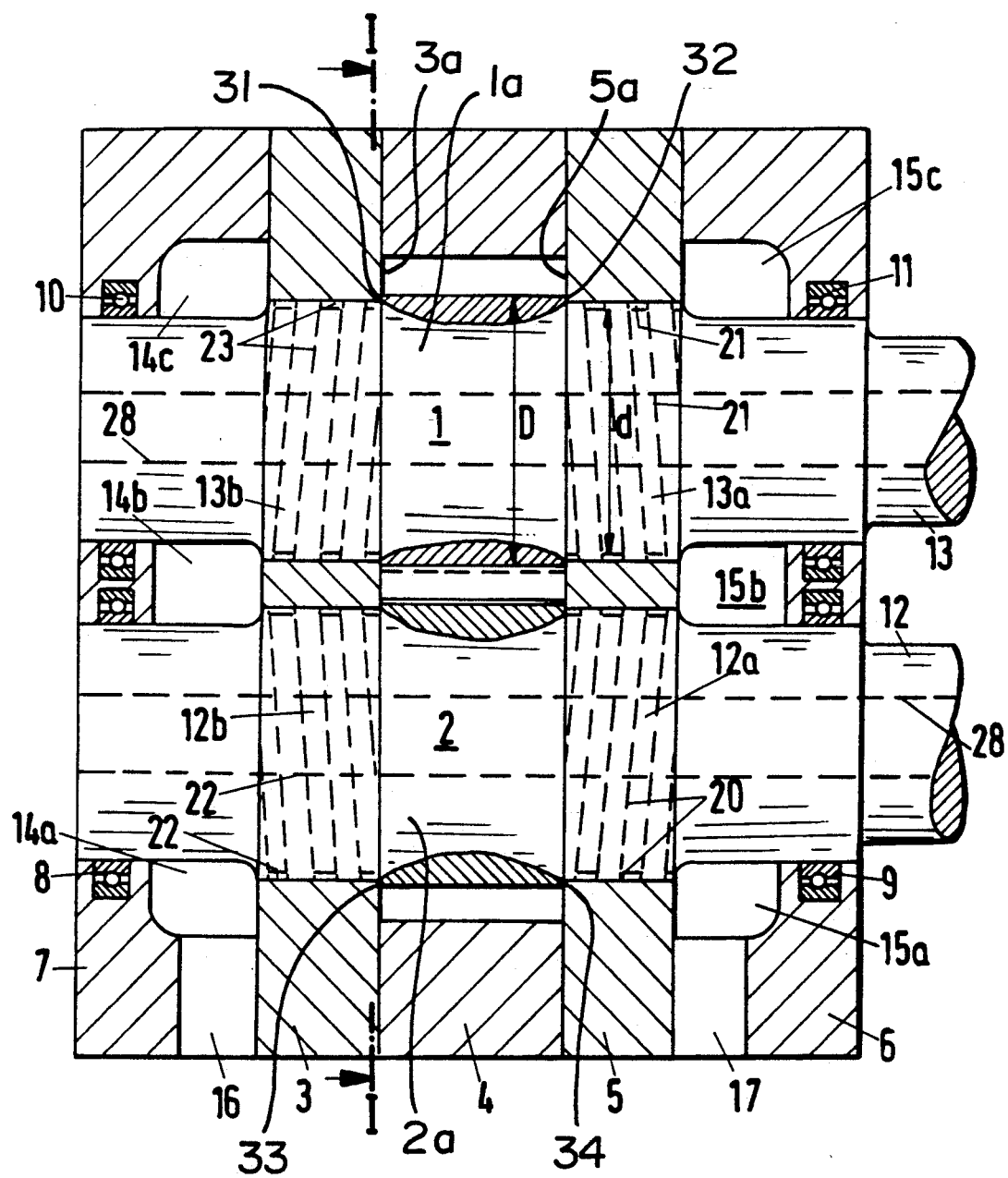
FIG. 2 is a plan view of a longitudinal section of the apparatus of FIG. 1.

In the plan view of FIG. 2, reference character D refers to the root circle diameter of the conveying element 1, and reference character (d) to the diameter of the shaft ends.

The conveying elements 1 and 2 are arranged in a housing 4 that is pressure-sealed on both sides by the sealing plates 3 and 5, which are fixed to the housing. The sealing plate 3 holds the end sections 12b and 13b and sealing plate 5 holds the shaft end sections 12a and 13a.

The bearing plates 6 and 7 are laterally attached to the sealing plates 5 and 3, respectively, by threaded fasteners (not shown). The bearing plates 6 and 7 support the bearings 8 and 9 on respective ends of the shaft section 12 and the bearings 10 and 11 on respective ends of the shaft section 13.

The shaft sections 12a, 12b, 13a and 13b are provided with helically configured return conveying channels 20, 22, 21 and 23, respectively, which serve for returning material that has penetrated into the respective gaps between the shaft section 12a and plate 5, shaft section 12b and plate 3, shaft section 13a and plate 5 and shaft section 13b and plate 3 to the space between the individual teeth of the conveying elements 1 and 2.

Figure 3:
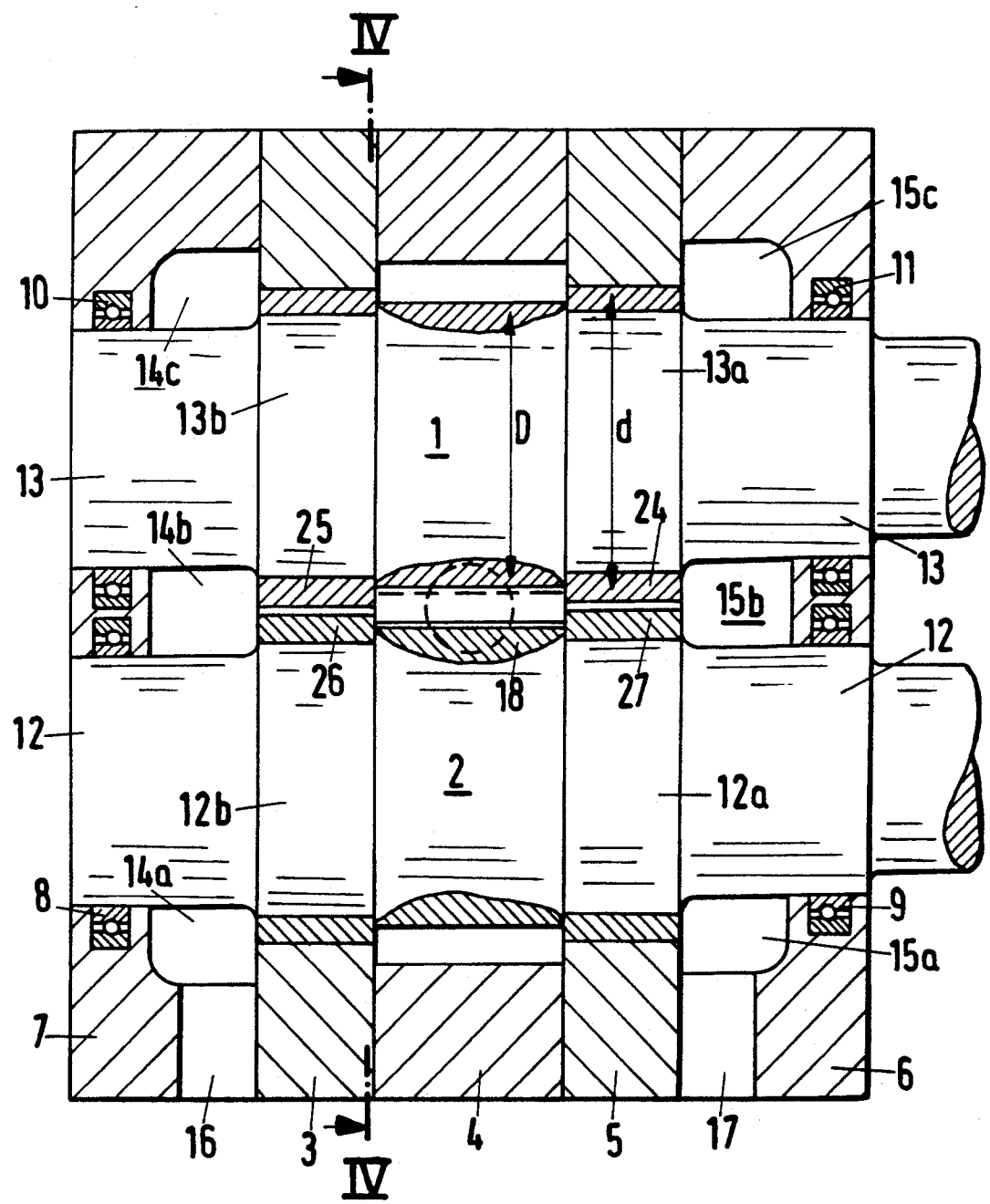
FIG. 3 is a plan view of a longitudinal section of another embodiment of the apparatus of the invention; and, FIG. 4 is a section view taken along lines IV—IV of FIG. 3.
Figure 4:
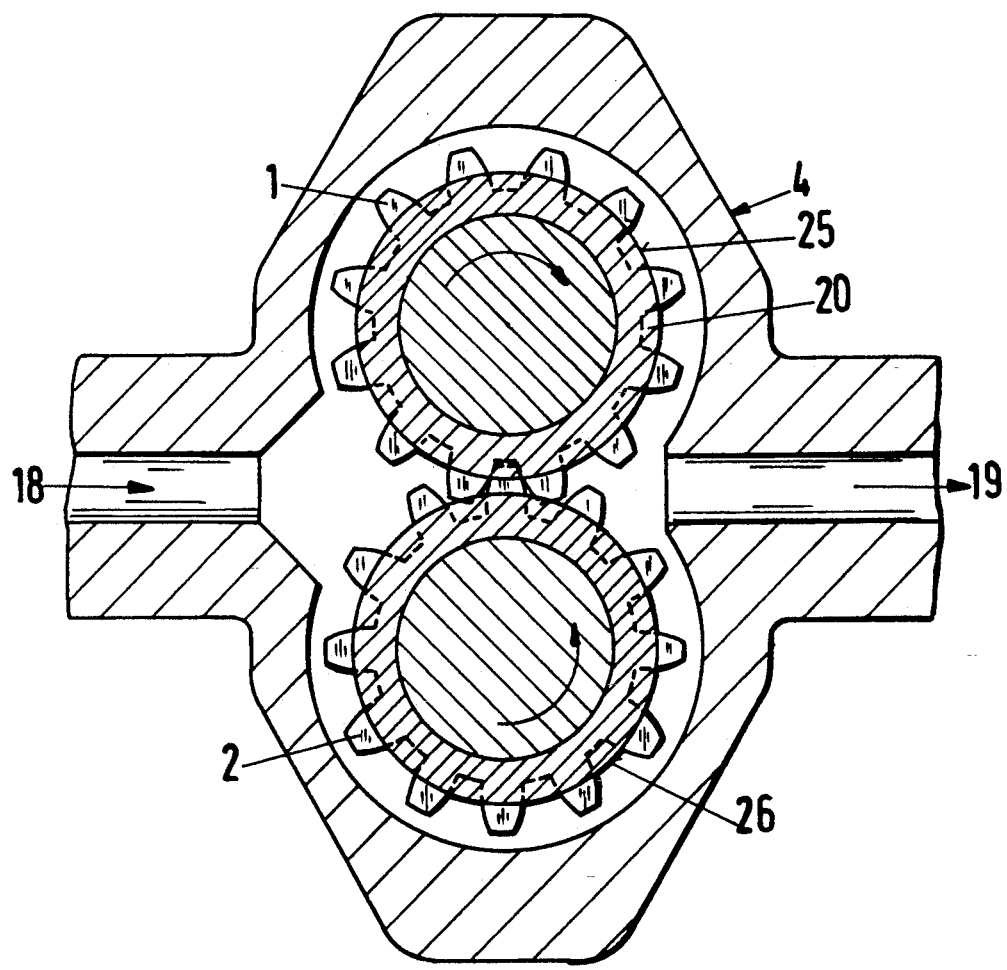

If, however, the conveying capacity of the return conveying threads is insufficient allowing material to penetrate through these gaps, then the material will be collected in the collection chambers 15a, 15b, and 15c at the right-hand end and the collection chambers 14a, 14b, and 14c at the left-hand end as shown in FIGS. 2 and 3.

The collected leakage material is removed from the apparatus via outlet channels 16 and 17 in order to keep the material from penetrating into the shaft bearings 8, 9, 10, and 11 and causing damage at the bearings. Controlling the temperature of the conveying elements 1 and 2 as well as of the adjacent shaft sections is effected via heating/cooling bores 28, which can be connected to a temperature control unit (not shown). Controlling temperature, in this case cooling of the conveying elements, is of great advantage because the conveying capacity of highly viscous types of rubber can be increased considerably without the occurrence of localized partial vulcanization.

For the conveying elements 1 and 2 of the apparatus of the invention, an axial sealing of the shaft sections 12a, 12b, and 13a, 13b is ensured by means of the return conveying threads 20, 22, 21, and 23, respectively.

Radial sealing, which constitutes a major problem, is avoided in a simple manner. By designing the shaft sections 12a, 12b, and 13a, 13b with a diameter (d) that corresponds more or less to the root circle diameter D of the conveying elements 1 and 2, there is no need for sealing at these locations since the critical end faces themselves are avoided.

Manufacturing the toothed conveying elements 1 and 2 with the shaft sections (12, 12a, 12b) and (13, 13a, 13b), respectively, each in one piece affords a significant advantage.

On the other hand, the center section of each shaft can be made to have a diameter D which is only slightly greater than the diameter (d) of the left-hand and right-hand sections of the shaft thereby providing narrow annular surfaces (31, 32 and 33, 34) at opposite ends of the center sections 1a and 2a of the shafts 1 and 2, respectively. The two annular surfaces of each center section are in surface-to-surface contact with corresponding side surfaces 3a and 5a of sealing plates 3 and 5. The narrow annular surface-to-surface interfaces providing guiding for the shafts while at the same time preventing a portion of the material conveyed from entering the interfaces.

By shrinking the sleeves 27, 26, 24, and 25 shown in FIG. 3 onto the respective shaft sections 12a, 12b, 13a and 13b, diameters of the shaft sections are obtained, which can correspond precisely to the root circle diameter D or can be greater than the root circle diameter D of the conveying elements 1 and 2, thus avoiding any problems with radial sealing.

FIG. 3 shows that diameter (d) is slightly greater than the root diameter D. Thus, sealing problems and a partial vulcanization of rubber due to a greater introduction of shearing energy are eliminated.

It is understood that the foregoing description is that of the preferred embodiments of the invention and that various changes and modifications may be made thereto without departing from the spirit and scope of the invention as defined in the appended claims.

What is claimed is:

1. An apparatus for producing a controllable uniform conveying pressure for processing highly viscous rubber or thermoplastic material, the apparatus comprising:

a housing having an inlet opening for receiving the material and an outlet for passing the material from the housing;

two shafts rotatably journalled in said housing and defining respective longitudinal axes;

each of said shafts being subdivided into a left-hand section, a center section and a right-hand section;

said shafts having respective toothed profiles at said respective center sections thereof;

said shafts being arranged side by side so as to cause said toothed profiles to intermesh in seal-tight contact while rotating to thereby receive the material from said inlet and convey the material to said outlet;

first mounting means for holding said left-hand sections of said shafts and second mounting means for holding said right-hand sections of said shafts thereby guiding and keeping said toothed profiles in alignment with each other as they rotate to convey the material;

said shafts having a diameter (d) at said left-hand and right-hand sections and said toothed profiles each having a root circle diameter (D) corresponding approximately to said diameter (d);

said root circle diameter (D) being slightly greater than said diameter (d);

said left-hand section and said center section of each shaft conjointly defining a left-hand annular surface in a plane perpendicular to the axis of the shaft;

said right-hand section and said center section of each shaft conjointly defining a right-hand annular surface in a plane perpendicular to the axis of the shaft;

said annular surfaces each having a width corresponding to one half of the difference of said diameters;

said first mounting means including a first plate for rotatably holding the left-hand section of each of said shafts;

said first plate having a surface in contact engagement with both of said left-hand annular surfaces thereby preventing a portion of the material from getting therebetween;

said second mounting means including a second plate for rotatably holding the right-hand section of each of said shafts; and, said second plate having a surface in contact engagement with both of said right-hand annular surfaces thereby preventing a portion of the material from getting therebetween.

2. The apparatus of claim 1, said sections and said toothed profile of each shaft being made from a single piece.

3. An apparatus for producing a controllable uniform conveying pressure for processing highly viscous rubber or thermoplastics material, the apparatus comprising:
- a housing having an inlet opening for receiving the material and an outlet for passing the material from the housing;
- two shafts rotatably journalled in said housing;
- each of said shafts being subdivided into a left-hand section, a center section and a right-hand section;
- said shafts having respective toothed profiles at said respective center sections thereof;
- said shafts being arranged side by side so as to cause said toothed profiles to intermesh in seal-tight contact while rotating to thereby receive the material from said inlet and convey the material to said outlet;
- first mounting means for holding said left-hand sections of said shafts and second mounting means for holding said right-hand sections of said shafts thereby guiding and keeping said toothed profiles in alignment with each other as they rotate to convey the material;
- said shafts having a diameter (d) at said left-hand and right-hand sections and said toothed profiles each having a root circle diameter (D) corresponding approximately to said diameter (d); and,
- sleeves seated on respective ones of said left-hand and right-hand sections so as to make the diameters of said left-hand and right-hand sections equal to or slightly greater than said root circle diameter (D).

4. An apparatus for producing a controllable uniform conveying pressure for processing highly viscous rubber or thermoplastics material, the apparatus comprising:
- a housing having an inlet opening for receiving the material and an outlet for passing the material from the housing;
- two shafts rotatably journalled in said housing;
- each of said shafts being subdivided into a left-hand section, a center section and a right-hand section;
- said shafts having respective toothed profiles at said respective center sections thereof;
- said shafts being arranged side by side so as to cause said toothed profiles to intermesh in seal-tight contact while rotating to thereby receive the material from said inlet and convey the material to said outlet;
- first mounting means for holding said left-hand sections of said shafts and second mounting means for holding said right-hand sections of said shafts thereby guiding and keeping said toothed profiles in alignment with each other as they rotate to convey the material;
- said shafts having a diameter (d) at said left-hand and right-hand sections and said toothed profiles each having a root circle diameter (D) corresponding approximately to said diameter (d); and,
- each of said left-hand and right-hand sections of each of said shafts having a helically-shaped material return channel formed therein to effect a seal with the mounting means corresponding thereto.

5. An apparatus for producing a controllable uniform conveying pressure for processing highly viscous rubber or thermoplastics material, the apparatus comprising:
- a housing having an inlet opening for receiving the material and an outlet for passing the material from the housing;
- two shafts rotatably journalled in said housing;
- each of said shafts being subdivided into a left-hand section, a center section and a right-hand section;
- said shafts having respective toothed profiles at said respective center sections thereof;
- said shafts being arranged side by side so as to cause said toothed profiles to intermesh in seal-tight contact while rotating to thereby receive the material from said inlet and convey the material to said outlet;
- first mounting means for holding said left-hand sections of said shafts and second mounting means for holding said right-hand sections of said shafts thereby guiding and keeping said toothed profiles in alignment with each other as they rotate to convey the material;
- said shafts having a diameter (d) at said left-hand and right-hand sections and said toothed profiles each having a root circle diameter (D) corresponding approximately to said diameter (d); and,
- said first mounting means being a first plate for holding said left-hand sections so as to permit said left-hand sections to rotate in said first plate;
- said second mounting means being a second plate for holding said right-hand sections so as to permit said right-hand sections to rotate in said second plate;
- each of said left-hand sections and said first plate and each of said right-hand sections and said second plate conjointly defining an interface;
- a third plate sandwiched between said first and second plates for conjointly defining therewith a conveying chamber for accommodating said toothed profiles and through which the material is conveyed from said inlet to said outlet;
- two bell-shaped pieces attached to said first and second plates, respectively, for holding bearing means for journalling said shafts in said housing;
- said first and second plates and said bell-shaped pieces defining respective collection chambers for receiving any material which has penetrated through said interfaces from said conveying chamber; and,
- said first, second and third plates and said bell-shaped pieces conjointly defining said housing.

6. An apparatus for producing a controllable uniform conveying pressure for processing highly viscous rubber or thermoplastics material, the apparatus comprising:
- a housing having an inlet opening for receiving the material and an outlet for passing the material from the housing;
- two shafts rotatably journalled in said housing;
- each of said shafts being subdivided into a left-hand section, a center section and a right-hand section;
- said shafts having respective toothed profiles at said respective center sections thereof;
- said shafts being arranged side by side so as to cause said toothed profiles to intermesh in seal-tight contact while rotating to thereby receive the material from said inlet and convey the material to said outlet;
- first mounting means for holding said left-hand sections of said shafts and second mounting means for holding said right-hand sections of said shafts thereby guiding and keeping said toothed profiles in alignment with each other as they rotate to convey the material;

said shafts having a diameter (d) at said left-hand and right-hand sections and said toothed profiles each having a root circle diameter (D) corresponding approximately to said diameter (d); and, sleeves shrunk fit on respective ones of said left-hand and right-hand sections.

7. An apparatus for producing a controllable uniform conveying pressure for processing highly viscous rubber or thermoplastics material, the apparatus comprising:

a housing having an inlet opening for receiving the material and an outlet for passing the material from the housing;

two shafts rotatably journalled in said housing;

each of said shafts being subdivided into a left-hand section, a center section and a right-hand section;

said shafts having respective toothed profiles at said respective center sections thereof;

said shafts being arranged side by side so as to cause said toothed profiles to intermesh in seal-tight contact while rotating to thereby receive the material from said inlet and convey the material to said outlet;

first mounting means for holding said left-hand sections of said shafts and second mounting means for holding said right-hand sections of said shafts thereby guiding and keeping said toothed profiles in alignment with each other as they rotate to convey the material;

said shafts having a diameter (d) at said left-hand and right-hand sections and said toothed profiles each having a root circle diameter (D) corresponding approximately to said diameter (d); and, bore means formed in said shafts to permit a fluid to be passed therethrough to control the temperature thereof.

* * * * *